United States Patent
Li

(10) Patent No.: US 9,588,648 B2
(45) Date of Patent: Mar. 7, 2017

(54) PROVIDING HISTORY-BASED DATA PROCESSING

(71) Applicant: Alibaba Group Holding Limited, George Town (KY)

(72) Inventor: Qingfeng Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 296 days.

(21) Appl. No.: 14/327,102

(22) Filed: Jul. 9, 2014

(65) Prior Publication Data

US 2015/0019567 A1   Jan. 15, 2015

(30) Foreign Application Priority Data

Jul. 12, 2013  (CN) .......................... 2013 1 0293881

(51) Int. Cl.
| | | |
|---|---|---|
| *G06F 17/30* | (2006.01) | |
| *G06F 3/00* | (2006.01) | |
| *G06Q 30/00* | (2012.01) | |
| *G06F 3/0482* | (2013.01) | |

(52) U.S. Cl.
CPC ...... *G06F 3/0482* (2013.01); *G06F 17/30699* (2013.01); *G06Q 30/00* (2013.01)

(58) Field of Classification Search
CPC .......................... G06F 3/0482; G06F 17/30699
See application file for complete search history.

(56) References Cited

U.S. PATENT DOCUMENTS

| | | |
|---|---|---|
| 6,847,387 B2 | 1/2005 | Roth |
| 7,810,035 B2 | 10/2010 | Dominowska et al. |
| 8,005,685 B1 | 8/2011 | Bird |
| 2005/0015728 A1 | 1/2005 | Ragan et al. |
| 2009/0083663 A1 | 3/2009 | Kim |
| 2010/0228560 A1 | 9/2010 | Salasaygun et al. |
| 2011/0022606 A1 | 1/2011 | Mason |
| 2011/0119628 A1 | 5/2011 | Carter et al. |
| 2013/0137518 A1 | 5/2013 | Lucas |

FOREIGN PATENT DOCUMENTS

| | | |
|---|---|---|
| WO | 2012166071 | 12/2012 |
| WO | 2013079968 | 6/2013 |

*Primary Examiner* — William Spieler
(74) *Attorney, Agent, or Firm* — Van Pelt, Yi & James LLP

(57) ABSTRACT

Providing data processing methods is disclosed, including: receiving a request to provide a plurality of data processing methods to a user; obtaining historical data associated with a plurality of historical user selections associated with the plurality of data processing methods, wherein the plurality of historical user selections is associated with the user; determining a plurality of data processing fingerprint aggregate scores corresponding to respective ones of the plurality of data processing methods based at least in part on the historical data; and providing the plurality of data processing methods based at least in part on the plurality of data processing fingerprint aggregate scores.

23 Claims, 8 Drawing Sheets

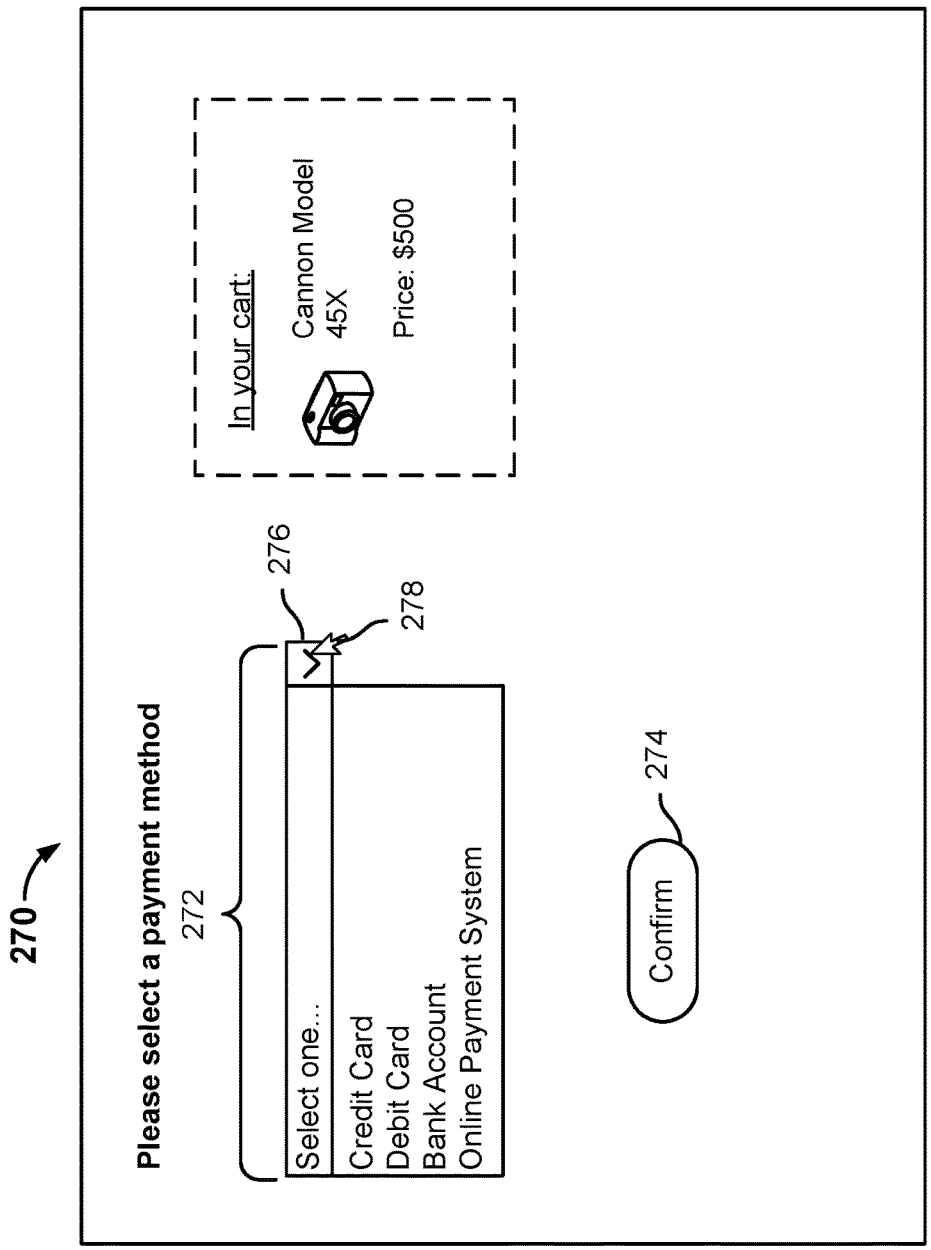

PROVIDING HISTORY-BASED DATA PROCESSING

CROSS REFERENCE TO OTHER APPLICATIONS

This application claims priority to People's Republic of China Patent Application No. 201310293881.6 entitled A METHOD AND DEVICE FOR PROVIDING DATA PROCESSING METHOD LISTS VIA COMMUNICATION NETWORKS, filed Jul. 12, 2013 which is incorporated herein by reference for all purposes.

FIELD OF THE INVENTION

The present application relates to the field of Internet technology. In particular, it relates to techniques of providing history-based data processing.

BACKGROUND OF THE INVENTION

When a user needs to select a data processing method for a specific objective, he or she will access a data processing method selection page. For example, when a user initiates an online purchase, he or she may access a web page that presents different payment methods that the user can select to complete the purchase. Conventionally, the various data processing methods (e.g., payment methods) are presented in a list according to a fixed sequence. Each data processing method represents a different method by which the specific objective can be accomplished. In other words, regardless of which user accesses the data processing method list, the user sees the same data processing method list each time. In this statically arranged data processing method list, if the first-choice data processing method (e.g., the highest ranked data processing method in the list) that is provided by the system to the user is not the most preferred data processing method by the user, the user will need to manually make another selection. For example, the user can make another selection of a different data processing method by interacting with a pull-down menu.

Providing data processing method lists to users with this conventional technique may prolong user data processing times and also degrade the user experience. Presenting a static sequence of data processing methods can be overly mechanical and not sufficiently user-friendly and customized to the user's particular needs.

BRIEF DESCRIPTION OF THE DRAWINGS

Various embodiments of the invention are disclosed in the following detailed description and the accompanying drawings.

FIG. 2C shows a second example of providing payment methods at a payment method selection web page.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of providing data processing methods are described herein. A request to provide a plurality of data processing methods for a user is received. For example, the data processing methods comprise alternative options that a user can select to complete a service. Historical data associated with historical user selections associated with the data processing methods is obtained. A data processing fingerprint aggregate score is determined for each data processing method based at least in part on the historical data. The data processing methods are provided based at least in part on their respective data processing fingerprint aggregate scores. In some embodiments, the data processing methods are ranked based on their respective data processing fingerprint aggregate scores. For example, the ranked data processing methods can be presented in a menu or a list.

Figure 1:
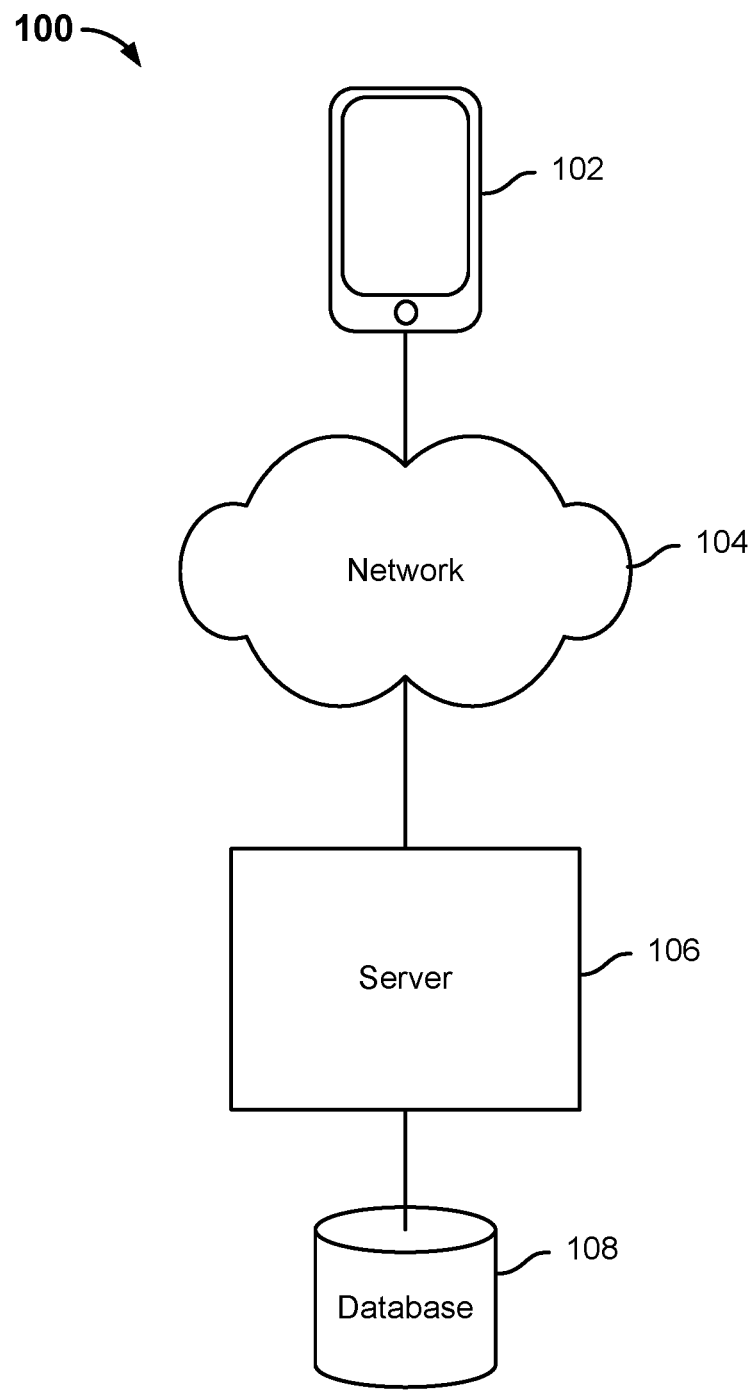
FIG. 1 is a diagram showing an embodiment of a system for providing a plurality of data processing methods.

FIG. 1 is a diagram showing an embodiment of a system for providing a plurality of processing methods. In the example, system 100 includes client device 102, network 104, server 106, and database 108. Network 104 includes high-speed data networks and/or telecommunications networks. Client device 102 is configured to communicate to server 106 over network 104. Server 106 is configured to access database 108.

While client device 102 is shown to be a smart phone, other examples of client device 102 include a desktop computer, a laptop computer, a tablet device, a mobile device, or any other computing device. A user may use client device 102 to access a website operated by server 106. For example, the website comprises an e-commerce website at which various products and/or services are sold. A user may make a selection to view a data processing method selection page at the website via client device 102. The section to view the data processing method selection page may cause a request to be sent to server 106 that prompts server 106 to provide a plurality of data processing methods from which the user can select one to use to proceed with a service. For example, if the website is an e-commerce website, then in response to the user's selection to make a payment for an online purchase at the e-commerce website, server 106 can generate a page presenting various available payment methods from which the user can select one payment method to use to complete the online purchase. Examples of different payment methods include: payment by credit card, payment by debit card, payment by an online payment system, and payment by a transfer of bank account funds. The selected payment method is then used to transfer the funds associated with the online purchase to an account associated with the merchant.

To provide these data processing methods to the user, server 106 is configured to obtain historical data stored for the user associated with the user's historical selections associated with the data processing methods. Examples of historical data include times at which historical data processing methods were selected, the data processing methods that were selected, the types of devices that were used to select the data processing method, the locations at which the data processing methods were selected, the monetary amounts associated with the selected data processing methods, the frequency at which the data processing method selections were made, and the success rates of the data processing method selections. For example, such historical data is stored at database 108, which is accessible by server 106. For example, the user is a registered user with the website and data associated with the user's account, including historical data associated with the user's historical selections associated with the data processing methods, can be identified using the user's identifier. The obtained historical data is used to determine for the user a data processing fingerprint aggregate score corresponding to each data processing method. As used herein, a "data processing fingerprint aggregate score" corresponding to a data processing method is determined based at least in part on analyzing the subset of the historical data associated with that data processing method and the data processing fingerprint aggregate score represents the user's behavior with respect to selecting that data processing method. A user's data processing fingerprint aggregate score corresponding to a data processing method represents a degree of the user's preference for and/or a historical frequency with which the user selected that data processing method.

As will be described in further detail below, the data processing methods are ranked based on their respective data processing fingerprint aggregate scores and then presented to the user based at least in part on such rankings. The data processing method that is ranked the highest is considered as the data processing method that the user has been historically most inclined to select. The highest ranking data processing method is referred to as the "predicted preferred data processing method" and is presented more conspicuously than the other data processing methods to the user. For example, the predicted preferred data processing method can be presented as the first option in a menu or otherwise ranked list of data processing methods. For example, server 106 can send page data to client device 102, where the page data includes content that can be rendered by client device 102 to present the ranked data processing methods.

Because the data processing methods are ranked based on historical data stored for a user before they are presented to the user, it is assumed that the predicted preferred data processing method is the data processing method most likely to be selected and confirmed by the user (e.g., the user can confirm the data processing method selection by selecting a confirmation control displayed at the data processing method selection page). As such, by displaying the predicted preferred data processing method as the first option among the available data processing methods, the user can easily find and confirm his or her desired data processing method without needing to search through all the data processing methods.

Figure 2A:
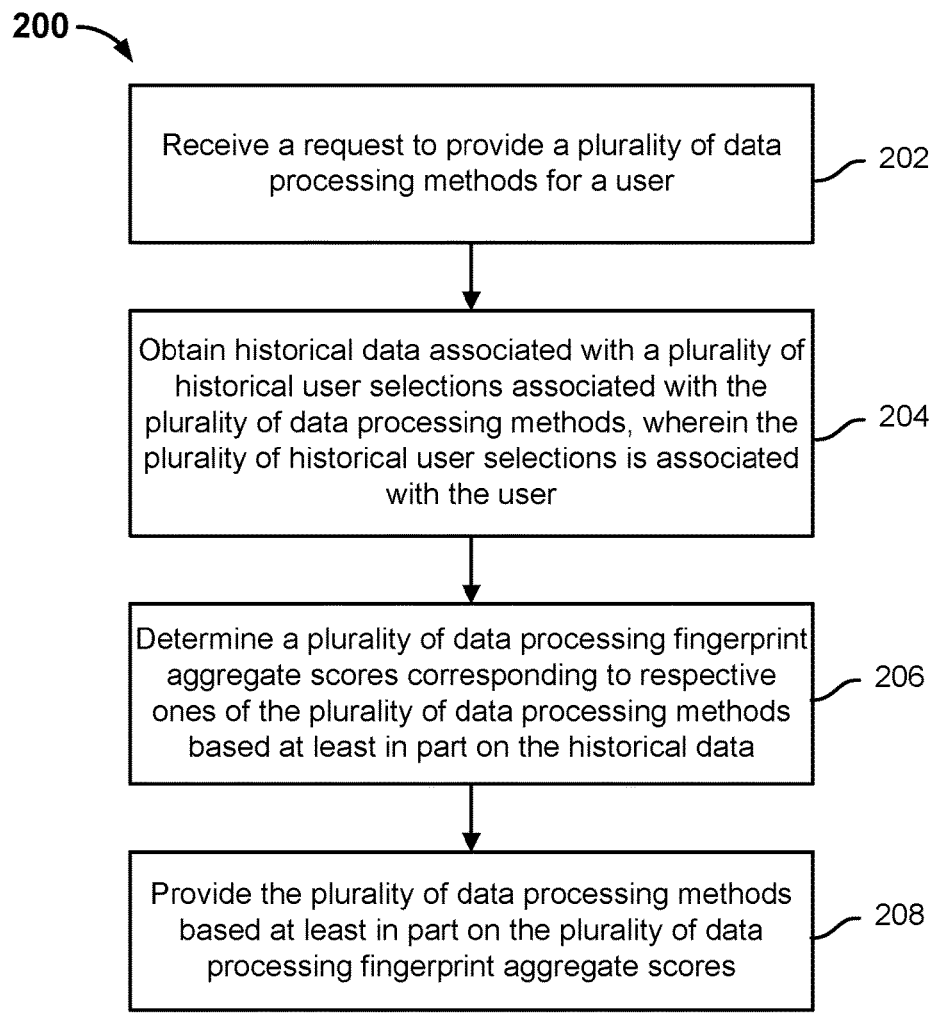
FIG. 2A is a flow diagram showing an embodiment of a process for providing a plurality of data processing methods.

FIG. 2A is a flow diagram showing an embodiment of a process for providing a plurality of processing methods. In some embodiments, process 200 is implemented at server 106 of system 100 of FIG. 1.

At 202, a request to provide a plurality of data processing methods for a user is received. A user engaging in a service may request for the presentation of several data processing methods from which to select a particular data processing method with which the service is to proceed. For example, the request for the presentation of the data processing methods may be issued in response to the user accessing a web page configured to present such data processing methods. The presentation may include a list or a menu of different data processing methods that comprise options of available data processing methods, in which one data processing method is to be selected by the user to use to complete the service.

While a presentation of data processing methods can be requested in various different applications, below are some example applications of presenting data processing methods: In a first example, when a user needs to select a payment method to complete an online shopping purchase, a request to provide data processing methods including various different payment methods from which the user can select a particular payment method can be generated. Examples of payment methods may include payment by a credit card, payment by a debit card, payment using an online payment service, and payment using a transfer of bank funds. In a second example, when a user needs to play a video on a web page, a request to provide data processing methods including various different video viewing options from which the user can select a video viewing method can be generated. Examples of video viewing methods may include using various different brands of video players and/or various different formats in which the video can be played. In a third example, when a user needs to download a file from the Web, a request to provide data processing methods including various different downloading methods from which the user can select a downloading method can be generated. Examples of file downloading methods may include different versions of the file to be downloaded, and/or different formats in which the different versions of the file can be downloaded.

At 204, historical data associated with a plurality of historical user selections associated with the plurality of data processing methods is obtained, wherein the plurality of historical user selections is made by the user. Each time that a user selects a data processing method from a presentation of data processing methods, data associated with that selection is stored. Data associated with a user selection of a data processing method may include, for example, one or more of the following: a user identifier associated with the data processing method selected by the user, the time at which that data processing method was selected, a device type (e.g., a mobile device, a non-mobile device) used to select that data processing method, and a location at which the data processing method was selected. Over time, as a user makes more selections of data processing methods, the historical data corresponding to those instances of the user's selections are accumulated and stored. In a specific example application in which data processing methods are being provided for a user to complete an online purchase and each data processing method comprises a different payment method, historical data may be obtained from historical user payments for past transactions/online purchases.

Historical data corresponding to user selections of data processing methods made by the user associated with the request is obtained from storage. For example, the historical data corresponding to the user for which the request to provide the data processing methods was issued may be identified based on the user identifier (e.g., an alphanumeric string) corresponding to that user, from a database table or the like.

In various embodiments, historical data refers to stored data relating to historical data processing methods selected by the user associated with the request. In various embodiments, historical data can include times at which historical data processing methods were selected, the data processing methods that were selected, the types of devices that were used to select the data processing methods, the locations at which the data processing methods were selected, the monetary amounts associated with the selected data processing methods, the frequency at which the data processing method selections were made, and the success rates of the data processing method selections. In some embodiments, feature values are extracted from each type of historical data and each instance of a historical user selection associated with data processing methods is scored based on the extracted values.

In a specific example application in which data processing methods are being provided for a user to complete an online purchase and each data processing method comprises a different payment method, the historical data related to historical payment method selections or historical transactions by the user may include "historical payment data," such as, for example, one or more of the following: the times at which the payments were made, the selected payment methods, the types of devices that were used to select the payment methods, the locations at which the payment methods were selected, the monetary amounts associated with the selected payment methods, the frequency at which the payment method selections were made, and the success rates of the data processing method selections.

At 206, a plurality of processing fingerprint aggregate scores corresponding to respective ones of the data processing methods is determined based at least in part on the historical data.

As described above, a "data processing fingerprint aggregate score" corresponding to a data processing method is determined based at least in part on analyzing the subset of the historical data associated with that data processing method and represents the user's behavior with respect to selecting that data processing method. A data processing fingerprint aggregate score corresponding to a data processing method represents a degree of the user's preference towards using that particular data processing method. For example, the higher the magnitude of a data processing fingerprint aggregate score associated with a data processing method, the higher the frequency with which the user has historically selected that data processing method and the lower the score, the lower the frequency with which the user has historically selected that data processing method.

Returning to the specific example application in which data processing methods are being provided for a user to complete an online purchase and each data processing method comprises a different payment method, the "data processing fingerprint aggregate scores" can also be referred to as "payment fingerprint aggregate scores." A payment fingerprint aggregate score corresponding to a payment method represents the user's behavior with respect to selecting that payment method. A payment fingerprint aggregate score corresponding to a payment method can represent a degree of the user's preference towards using that particular payment method. For example, the higher the magnitude of a payment fingerprint aggregate score associated with a payment method, the higher the frequency with which the user has historically selected that payment method and the lower the score, the lower the frequency with which the user previously has historically selected that payment method.

An example of determining the data processing fingerprint aggregate score corresponding to each data processing method is described with FIG. 3, below.

Returning to process 200, at 208, the plurality of processing methods are provided based at least in part on the plurality of data processing fingerprint aggregate scores. The various data processing methods are ranked based on their respective data processing fingerprint aggregate scores. In various embodiments, the data processing method associated with the highest data processing fingerprint aggregate score is referred to as the "predicted preferred data processing method." In some embodiments, the predicted preferred data processing method is presented in a more conspicuous manner than the remaining data processing methods and the remaining data processing methods can be displayed in a sequence determined based on their respective data processing fingerprint aggregate scores (e.g., where the data processing methods are ranked based on the highest to lowest data processing fingerprint aggregate scores). In some embodiments, the predicted preferred data processing method can be presented in the first position of a menu of data processing methods and/or of a ranked list of data processing methods. For example, if the data processing methods were displayed within a drop-down menu, the predicted preferred data processing method can be displayed as the first option within the menu and the remaining data processing methods can be displayed as the second through last options based on their respective data processing fingerprint aggregate score rankings. In some embodiments, the predicted preferred data processing method can be the default selected data processing method such that if the user does not change the selection to another data processing method, the predicted preferred data processing method is the data processing method that is confirmed to complete the service. Put another way, the predicted preferred data processing method is predicted as the desired data processing method selection for the user and is configured to be the data processing method that is the most convenient for the user to select/confirm. Because the predicted preferred data processing method is predicted to be the one that the user most frequently selects, by providing the predicted preferred data processing method as the most convenient option to select could save the user the time and effort that would otherwise be spent on reviewing the possible data processing options.

Returning to the specific example application in which data processing methods are being provided for a user to complete an online purchase and each data processing method comprises a different payment method, the payment methods are provided to the user in a ranked list that is determined based at least in part on their respective data processing fingerprint aggregate scores. The "predicted preferred data processing method" in the payment method selection application can be referred to as the "predicted preferred payment method." The predicted preferred payment method can be displayed in a more conspicuous manner than the remaining payment methods and the remaining payment methods can be displayed in a sequence determined based on their respective payment method fingerprint aggregate scores (e.g., where the payment methods are ranked from the highest to lowest payment fingerprint aggregate scores).

Figure 2B:
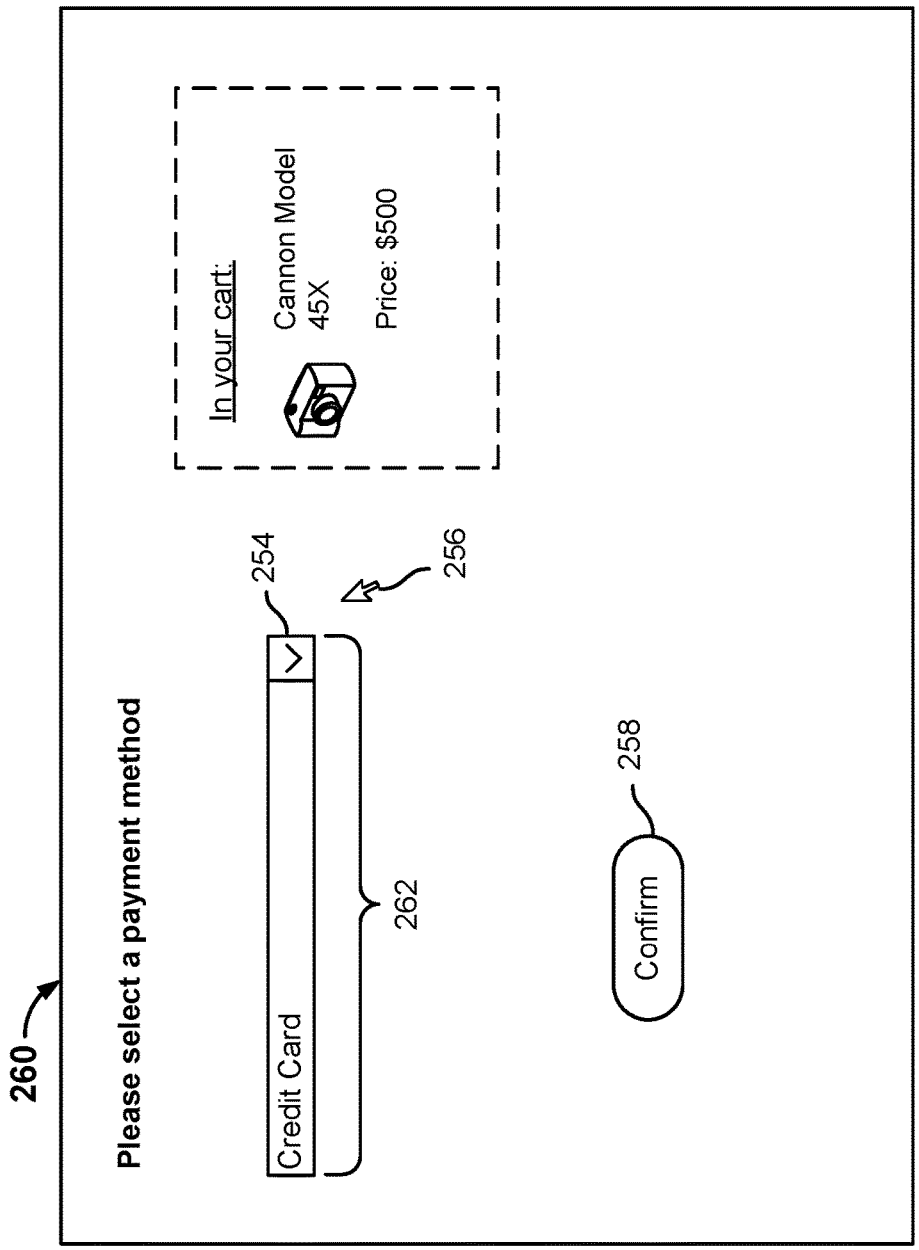
FIG. 2B shows a first example of providing payment methods at a payment method selection web page.

FIG. 2B shows a first example of providing payment methods at a payment method selection web page. For example, web page 260 may be presented to a user in response to a user selection to make an online purchase. In the example, the user desires to purchase a product (e.g., the Cannon Model 45X) in his shopping cart at an e-commerce website and has selected to proceed with checkout. Web page 260 may be presented in response to the user selection associated with checking out. In the example, steps 202 through 206 of process 200 of FIG. 2A have already been performed and web page 260 shows an example of providing data processing methods at step 208. In this example, among the four available payment method options (e.g., credit card, debit card, online payment system, and bank account), the predicted preferred payment determined for the user based on historical data stored for the user is payment by credit card.

Web page 260 shows a first example of presenting the predicted preferred payment method in which the predicted preferred payment method of "credit card" is preselected in the selection area of drop-down menu 262 with the initial display of web page 260. This way, if the user decides to choose a payment method other than the predicted preferred payment method, the user would need to open the drop-down list of all the available payment method options by selecting drop-down button 254 using cursor 256. Otherwise, if the user does decide to choose the predicted preferred payment method, then to complete the transaction, the user may simply select "Confirm" button 258 to proceed with the preselected payment method of credit card.

FIG. 2C shows a second example of providing payment methods at a payment method selection web page. Web page 270 shows an alternate example of presenting payment methods from the example shown at web page 260 of FIG. 2B. Similar to the example of FIG. 2B, in the example of FIG. 2C, payment by credit card is determined to be the predicted preferred payment method for the user making the online purchase. At web page 270, no payment method is preselected in the drop-down menu 272 but the predicted preferred payment method is presented first in the ranked drop-down list in response to a user selection of drop-down button 276 via cursor 278. This way, the user may quickly find the predicted preferred payment method among the list of available payment methods. Once the user selects the desired payment method from the drop-down list, the user can select "Confirm" button 274 to proceed with the selected payment method.

Figure 3:
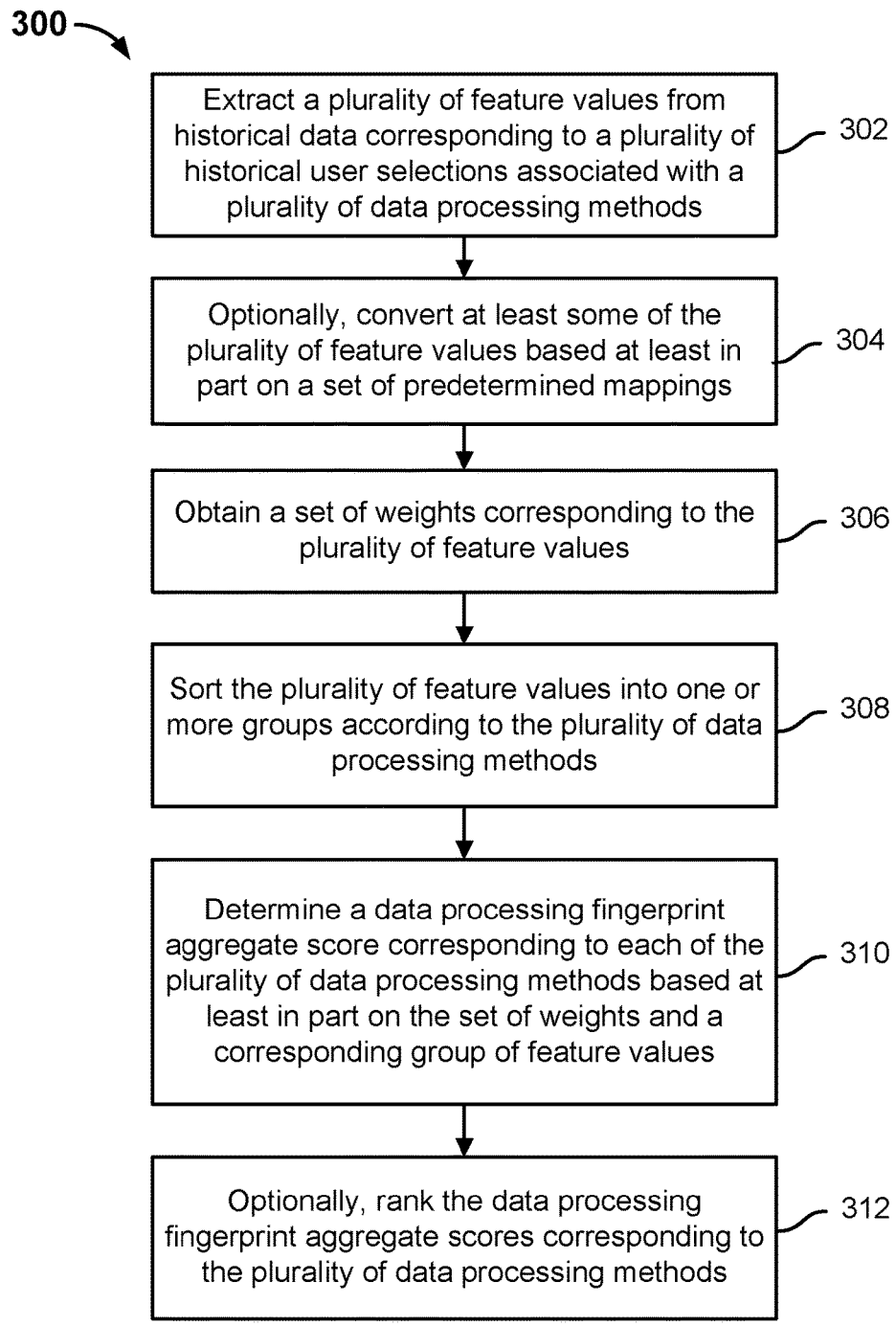
FIG. 3 is a flow diagram showing an example of a process for determining a plurality of data processing fingerprint aggregate scores corresponding to respective data processing methods.

FIG. 3 is a flow diagram showing an example of a process for determining a plurality of processing fingerprint aggregate scores corresponding to respective data processing methods. In some embodiments, process 300 is implemented at server 106 of system 100 of FIG. 1. In some embodiments, step 206 of process 200 is implemented using process 300 of FIG. 3.

At 302, a plurality of feature values is extracted from historical data corresponding to a plurality of historical user selections associated with a plurality of data processing methods. Generally, feature extraction is a technique that maps input information to a reduced set of information such that the input information can be accurately recognized or classified based on the reduced representation of features. A feature is a variable that is used to represent a characteristic of the input information. Features are selected and defined by designers of a feature extraction and are processed to help decode/classify the input information, distinguish and/or disambiguate the input information, and/or accurately map the input information to the output values. As applied to the present application, feature extraction is used to analyze historical data corresponding to a user's historical user selections associated with a plurality of data processing methods. In various embodiments, the set of feature values to extract from historical data corresponding to the historical user selections of a user is predetermined. In some embodiments, a feature value may be a non-numerical or a numerical value.

In various embodiments, a set of feature values can be extracted from the stored historical data corresponding to each instance of a historical user selection of a data processing method by the user.

For example, a set of feature values associated with each instance of a historical user selection of a data processing method by the user may include, but is not limited to, one or more of: a time at which the user selection was made, the selected data processing method, a device type used to make the user selection of the data processing method, the location at which the user selection of the data processing method was made, and a monetary amount associated with the selected data processing method. In a specific example application in which data processing methods are payment methods, feature values associated with each instance of a historical user selection of a payment may include, but are not limited to, one or more of: a time at which the user selection was made, the selected payment method, a device type used to make the user selection, the location at which the user selection was made, and a transaction amount associated with the selected payment method.

At 304, optionally, at least some of the plurality of feature values is converted based at least in part on a set of predetermined mappings. In some embodiments, because the features values are to be input into formulas to compute data processing fingerprint aggregate scores, at least some of the extracted feature values that are non-numerical in value are converted into corresponding predetermined numerical values. Step 304 is optional because if all feature values are already numerical in value, then such conversion does not need to be performed. Or if only a subset of the extracted subset of feature values that will be used to compute data processing fingerprint aggregate scores is already numerical in value, then step 304 may not be performed.

For example, feature values such as a device type (e.g., a mobile device or a non-mobile device) used to make the user selection of a data processing method and the location (e.g., the particular city) at which the user selection of the data processing method was made are non-numerical. As such, a mapping can be predetermined to convert each of such feature values to a numerical value. In some embodiments, different values associated with the same feature can be mapped to the same numerical value or different values. In some embodiments, the same or different mappings may be predetermined for feature values associated with different data processing methods.

For example, the feature value of payment type can be a mobile device or a non-mobile device and the predetermined mappings can map the mobile device to a "2" and map the non-mobile to a "1." For example, the feature value of the location associated with a user selection of a payment method can be set according to city tier based on population. For example, the predetermined mappings can map a first-tier city (e.g., major population centers such as Beijing, Shanghai, Guangzhou, or Shenzhen) to a "4," a second-tier city to a "3," a third-tier city to a "2," and a fourth-tier or lower city to a "1."

At 306, a set of weights corresponding to the plurality of feature values is obtained. In various embodiments, a weight can be set for each extracted feature value. In some embodiments, the weights corresponding to various feature values are set empirically. The weights corresponding to various feature values can be predetermined. In one specific example, the weights obtained for the three feature values of a device used to make the user selection of a data processing method ("the data processing device type," the location (e.g., the particular city) at which the user selection of the data processing method was made ("the data processing location"), and a monetary amount associated with the selected data processing method ("the data processing monetary amount") are as follows: data processing device type: 0.2, data processing location: 0.1, and data processing monetary amount: 0.2. In a specific example application in which data processing methods are payment methods, example weights for three feature values can be set as follows: payment type: 0.2, payment location: 0.1, and transaction amount: 0.2.

The above weights are merely examples and any other appropriate weights may be selected in actual implementation.

At 308, the plurality of feature values is sorted into one or more groups according to the plurality of processing methods. The extracted sets feature values corresponding to respective historical user selections of data processing methods are sorted into groups based on the data processing method feature values, where each group includes only sets of feature values corresponding to historical user selections associated with one particular data processing method.

At 310, a data processing fingerprint aggregate score corresponding to each of the plurality of data processing methods is determined based at least in part on the set of weights and a corresponding group of feature values. In various embodiments, at least some of the feature values sorted into the same group associated with a particular data processing method are combined using corresponding weights to determine the data processing fingerprint aggregate score corresponding to that particular data processing method.

In a first example, an individual score corresponding to each historical user selection of a data processing method is determined given the three feature values of the data processing device type, the data processing location, and the data processing monetary amount and their respective obtained weights of w1, w2, and w3, which are determined empirically or predetermined. The individual score can be calculated using the formula below:

$$\text{Individual Score} = \text{Data processing device type} \times w1 + \text{Data processing location} \times w2 + \text{Data processing monetary amount} \times w3 \quad (1)$$

According to formula (1) above, each of the three feature values of the data processing device type, the data processing location, and the data processing monetary amount associated with a historical user selection of a data processing method is multiplied by its respective weight (e.g., w1=0.2, w2=0.1, and w3=0.2) and summed together to determine the individual score corresponding to that instance of a historical user selection of a data processing method. Then, the individual scores of each historical user selection of a data processing method of each group are summed together to determine the data processing fingerprint aggregate score for the data processing method corresponding to that group. In a specific example application in which data processing methods are payment methods, the individual scores corresponding to historical transactions of the same payment method are first determined and then, the individual scores associated with the same payment method are summed together to determine the payment fingerprint aggregate score corresponding to that payment method.

Formula (1) is merely illustrative and other formulas may be used to compute the individual score in actual implementation.

In another example, for each different data processing method, the historical user selections of data processing methods whose feature values of device type and location are the same are first identified. Then, for each different data processing method, the data processing monetary amounts for the identified historical user selections of data processing methods with the same feature values of device type and location are summed together. Finally, one or more appropriate computations can be performed based on the sums of data processing monetary amounts to obtain respective data processing fingerprint aggregate scores corresponding to each data processing method. In a specific example application in which data processing methods are payment methods, the transaction amounts of historical transactions whose feature values of device type and location are the same are first summed together and then, one or more appropriate computations can be performed based on the summed transaction amounts to obtain respective payment fingerprint aggregate scores corresponding to each payment method.

The described techniques by which to obtain data processing fingerprint aggregate scores are merely illustrative and other appropriate techniques may be used to compute the data processing fingerprint aggregate scores corresponding to respective data processing methods.

In some embodiments, the payment fingerprint aggregate scores corresponding to a user's previous data processing account may be used to modify the data processing fingerprint aggregate scores determined for the user's current request to provide data processing methods associated with the user's new current data processing account. The previous data processing account can be identified based on the data processing fingerprint aggregate scores determined for the new account. In some instances, some users might register a new data processing account after canceling an older data processing account. Specifically, in the case of a user who registers a new data processing account after canceling an old data processing account, the data processing fingerprint aggregate scores corresponding to the user's new account can be determined based on collected historical data after the user has used the new account to select data processing methods a certain number of times. The user's previous, canceled data processing account can be matched on the basis of the data processing fingerprint aggregate scores determined for the new account. For example, in the case of a user who registers a new payment account after canceling an older payment account, the payment fingerprint aggregate scores corresponding to the user's new account can be obtained after the user has used the new account to perform transactions a certain number of times. The user's previous, canceled payment account can be matched on the basis of the payment fingerprint aggregate scores corresponding to the user's new account. In some embodiments, the user's data processing fingerprint aggregate scores within a certain time period are related and matched to data processing fingerprint aggregate scores previously determined for the user's previous data processing account. For example, a user whose data processing fingerprint aggregate scores has a match degree higher than 80% with the data processing fingerprint aggregate scores determined from a previous (e.g., canceled) data processing account can be confirmed as an old user associated with that previous data processing account. Then the data processing fingerprint aggregate scores determined from the matched data processing account can be acquired from a data processing fingerprint database and used to update the data processing fingerprint aggregate scores determined for the user's new data processing account. As such, in some instances, if a user's data processing account is relatively new and/or the user may not have performed many historical user selections of data processing methods, historical data associated with the same user but from a different data processing account can be identified and used to modify/compute the data processing fingerprint aggregate scores corresponding to respective data processing methods for the new user data processing account.

At 312, optionally, the data processing fingerprint aggregate scores corresponding to the plurality of data processing methods are ranked. Because the data processing methods are ranked based on their respective data processing fingerprint aggregate scores, the data processing fingerprint aggregate scores themselves can be ranked to determine the ranking of the corresponding data processing methods. For example, the data processing fingerprint aggregate scores can be ranked from high to low. The data processing method corresponding to the highest ranked data processing fingerprint aggregate score is the predicted preferred data processing method.

In some other embodiments, in addition to using the data processing fingerprint aggregate scores determined above, data associated with the current instance of data processing by the user is also used to present the data processing methods. Data associated with the current instance of data processing can include known feature values relating to the current instance of data processing. For example, at least some feature values associated with the current instance of data processing may serve as factors to determine the optimal predicted preferred data processing method. In this way, it is possible to more accurately provide users with optimal predicted preferred data processing methods. In a specific example application in which data processing methods are payment methods, in addition to considering the payment fingerprint aggregate scores described above, data associated with the user's current transaction can also be considered in presenting the payment methods. For example, if the location of the user's current transaction is a fourth-tier or lower city, the ranking of the "Cash data processing" payment method can be moved up one position in the ranking of the payment methods as determined by their respective payment fingerprint aggregate scores.

In some embodiments, when the data processing fingerprint aggregate scores of two or more different data processing methods are the same, one of such data processing methods can be randomly selected and determined as the predicted preferred data processing method. In some embodiments, when N (N>=2) scores of data processing methods are the same, each of the N data processing methods is marked a value from 1 to N. Each time that a request to provide data processing methods is received, the system invokes a random function to randomly generate a random number each time from 1 to N and determines the data processing method corresponding to this random number as the predicted preferred data processing method in the presentation of the data processing methods.

Figure 4:
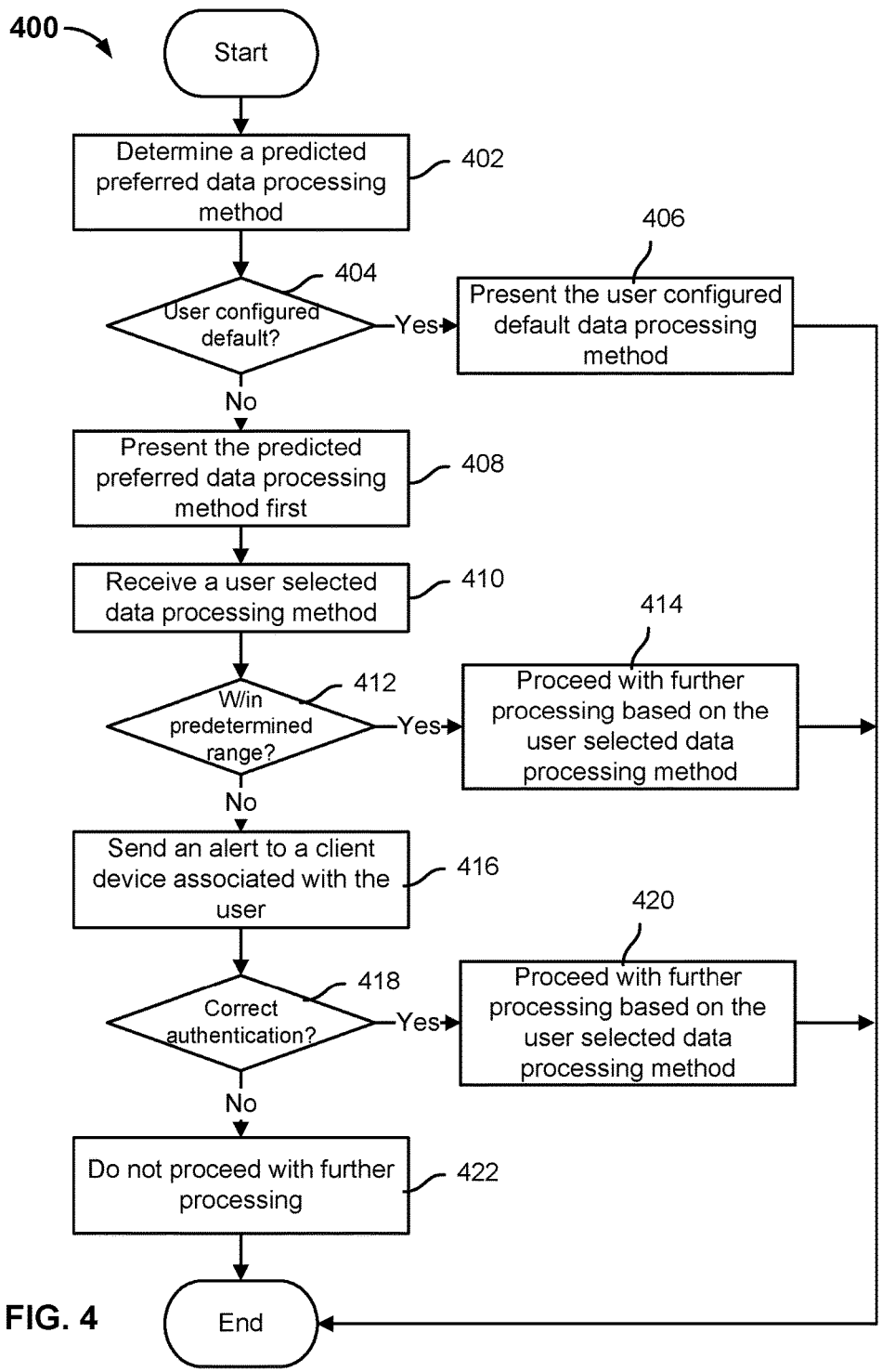
FIG. 4 is a flow diagram showing an embodiment of a process for providing a plurality of data processing methods.

FIG. 4 is a flow diagram showing an embodiment of a process for providing a plurality of data processing methods. In some embodiments, process 400 is implemented at server 106 of system 100 of FIG. 1. In some embodiments, step 208 of process 200 is implemented using process 400 of FIG. 4.

At 402, a predicted preferred data processing method is determined. In some embodiments, the predicted preferred data processing method of the multiple available data processing methods is determined using process 300 of FIG. 3.

As described above, in some embodiments, the data processing method associated with the highest data processing fingerprint aggregate can be determined and presented as the predicted preferred data processing method among the available data processing methods. The predicted preferred data processing method can be presented more conspicuously than the other data processing methods. For example, the predicted preferred data processing method can be presented as the first option within a drop-down menu of data processing methods or in the first position within a ranked list of data processing methods.

At 404, it is determined whether a user configured default data processing method is stored. In various embodiments, a user may or may not have configured a default data processing method. For example, a user can configure a particular data processing method as a default data processing method to be stored with data included in the user's data processing account. When the data processing methods are to be provided to the user, in some embodiments, it is determined whether the user has configured a default data processing method. In a specific example application in which data processing methods are being provided for a user to complete an online purchase, the system may first check whether the user has configured a default payment method prior to presenting a ranked list of payment methods to the user.

In the event that it is determined that the user has configured a default data processing method, control is transferred to 406. Otherwise, in the event that it is determined that the user has not configured a default data processing method, control is transferred to 408.

At 406, the user configured default data processing method is presented to the user. In some embodiments, only the user configured default data processing method and none of the other data processing methods is presented to the user. In some embodiments, if the user configured default data processing method differs from the system determined predicted preferred data processing method, then the user configured default data processing method overrides the system determined predicted preferred data processing method and is presented as the first option to the user among the available data processing methods. In a specific example application in which data processing methods are being provided for a user to complete an online purchase, in the event that it is determined that the user has configured a default payment method, then only the default payment and none of the other payment methods is presented to the user. After 406, process 400 ends.

At 408, the predicted preferred data processing method is presented first among the data processing methods. In the event that it is determined that no user configured default data processing method exists, the predicted preferred data processing method, the data processing method corresponding to the highest data processing fingerprint aggregate score, is presented as the first option among the data processing methods for the user.

In a specific example application in which data processing methods are being provided for a user to complete an online purchase and each data processing method comprises a different payment method, the predicted preferred payment method can be provided first among all available payment methods within a drop-down menu. For example, when a user makes a selection to access a data processing method selection page, the system will receive a processing request for providing the data processing method and then present the available data processing methods in a ranked list. For example, the user can make a selection to access a data processing method selection page by selecting a "Settle Account" or "Pay Now" button on an online shopping web page, and in response to the button selection, a corresponding payment request will be sent to the server to prompt the server to generate and provide a list of ranked payment methods.

At 410, a user selected data processing method is received. After the presentation of the data processing methods, a user selection of a data processing method is received. As used herein, the "user selected data processing method" is the data processing method that the user selects and confirms from the presented data processing methods. For example, the user selection is received in response to the user selecting (e.g., clicking on) a desired data processing method of the presented data processing method(s) and further selecting a confirmation control (e.g., a submit button) displayed at the same web page as the presented data processing methods. In some embodiments, because the predicted preferred data processing method is presented as the first option, the predicted preferred data processing method is selected by default unless the user (e.g., interacts with the drop-down menu and/or other ranked list) manually selects another data processing method. If the user does not manually select another data processing method, the user can confirm the selection of the predicted preferred data processing method simply by selecting the confirmation control.

In a specific example application in which data processing methods are being provided for a user to complete an online purchase and each data processing method comprises a different payment method, the user can confirm the predicted preferred data processing method to use to complete the transaction or not accept this payment method and instead select another payment method on his or her own to use to complete the transaction.

At 412, it is determined whether a ranking of the user selected data processing method is within a predetermined ranking range. A ranking of the user selected data processing method relative to the rankings of the other data processing methods is determined by comparing the user selected data processing method to the ranked data processing methods. If the user selected data processing method matches the predicted preferred data processing method, then the ranking of the user selected data processing method is in the first ranking/position. Otherwise, if the user selected data processing method matches another data processing method, the user selected data processing method would be associated with the ranking/position of the matched data processing method.

As mentioned above, the data processing methods are ranked based on respective data processing fingerprint aggregate scores, which correspond to the user's respective degrees of preference towards using those data processing methods. As such, a predetermined range of rankings can be set that corresponds to a range of data processing methods that the user typically prefers to select. For example, the predetermined range of rankings may include the top three ranked data processing methods. It is assumed that a user selected data processing method whose ranking is within the predetermined range is a normal user selection but that a user selected data processing method whose ranking is outside of the predetermined range is not a normal user selection because it is not one of the top data processing methods historically selected by the user.

The predetermined range of rankings of the top three ranked data processing methods is merely an example and any appropriate predetermined range of rankings can be selected in actual implementation.

In the event that it is determined that the ranking of the user selected data processing method is within the predetermined range, control is transferred to 414. Otherwise, in the event that it is determined that the ranking of the user selected data processing method is not within the predetermined range, control is transferred to 416.

At 414, further processing proceeds based on the user selected data processing method. Because the ranking of the user selected data processing method is within the predetermined range, the user selected data processing method is used for further processing. For example, if the user selected data processing method were a user selected payment method, then the transaction would be completed on the basis of that selected payment method. After 414, process 400 ends.

At 416, an alert is sent to a client device associated with the user. In various embodiments, an alert is sent to the client device (e.g., via a number of the mobile device associated with the user's data processing account) to indicate to the user that he or she is selecting a data processing method that is not historically a more preferred data processing method. For example, the alert may comprise a short message service (SMS) message. In some embodiments, the user may be asked in this alert to confirm the data processing method to continue. In a specific example application in which data processing methods are being provided for a user to complete an online purchase and each data processing method comprises a different payment method, in the event that the user selected payment method is not within the predetermined range of rankings (e.g., the top three rankings), then the user is prompted via the alert to confirm the user selected payment method in order to complete the transaction.

By sending the user a short message alert (or by sending an alert via another form of communication), the user associated with the data processing account may be alerted to the event that a user using the account has made a selection of the user selected data processing method and can be prompted to determine whether or not to continue on the basis of the user selected data processing method. For example, an SMS message may be sent to the user's mobile phone number registered with the user's data processing account to alert the user that the user selected data processing method is not a data processing method that he or she has frequently used in the past. In some embodiments, the alert message may also include an authentication code. If the user enters the authentication code into a designated location on the data processing page within a prescribed period of time, it will be determined that the data processing account of the user is not being fraudulently used and will therefore continue with further processing on the basis of the user selected data processing method. On the other hand, if the user does not enter and submit the authentication code into the designated location on the data processing page within a prescribed period of time and/or enters an incorrect authentication code, then this data processing will fail and no further processing will proceed. In a specific example application in which data processing methods are being provided for a user to complete an online purchase and each data processing method comprises a different payment method, an SMS message alert can be sent to the user's mobile phone number registered with the user's data processing account indicating that the recent user selected payment method is not a payment method that he or she has frequently used in the past. The alert may also include an authentication code that the user can input into the designated location on the payment processing page to confirm that the user selected payment method for the transaction is not fraudulent, as described above.

At 418, it is determined whether a correct authentication code has been received. In the event that the user has input the correct authentication code that was included in the alert message and within the prescribed period of time, then further processing proceeds based on the user selected data processing method at 420. Otherwise, in the event that the user has not input the correct authentication code that was included in the alert message and/or the user has input the authentication code beyond the prescribed period of time, then further processing does not proceed at 422 because it is assumed that fraud may have occurred.

The use of SMS messages for alerts is merely an example and any appropriate type of message may be used for alerts in actual implementation.

Figure 5:
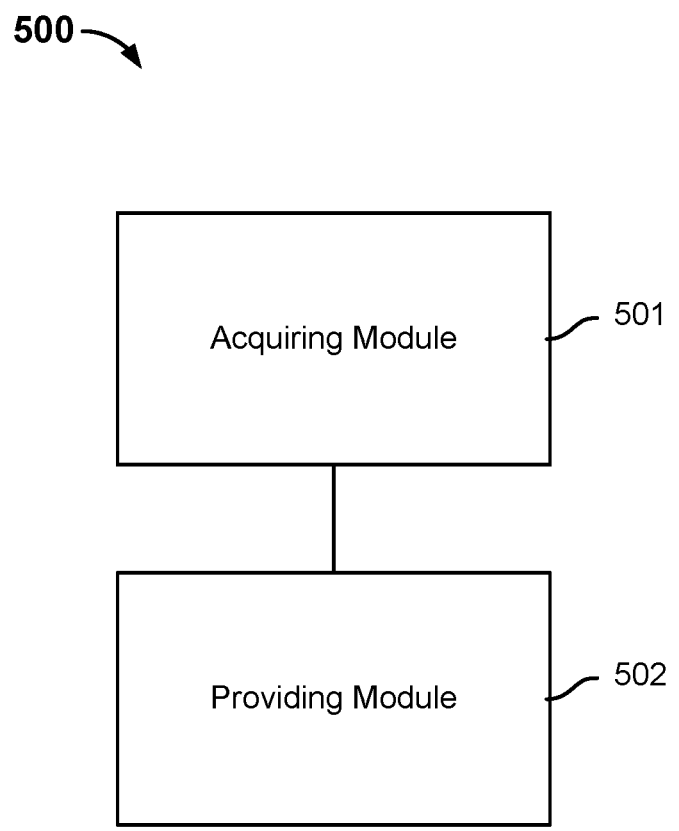
FIG. 5 is a diagram showing an embodiment of a system for providing data processing methods.

FIG. 5 is a diagram showing an embodiment of a system for providing data processing methods. In the example, system 500 includes acquiring module 501 and providing module 502.

The modules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Acquiring module 501 is configured to obtain data processing fingerprint aggregate scores based at least in part on historical processing data and providing module 502 is configured to present data processing methods according to data processing fingerprint aggregate scores.

In some embodiments, providing module 502 may further comprise: an acquiring module. The acquiring module is configured to obtain the predicted preferred data processing method based on the data processing fingerprint aggregate scores.

In some embodiments, acquiring module 501 may further comprise: an extracting module, a conversion module, a weighting module, and a calculating module. The extracting module is configured to extract data processing feature values from historical data associated with historical user selections of data processing methods. The conversion module is configured to convert at least some (e.g., non-numerical feature values) into predetermined (e.g., numerical) values. The weighting module is configured to obtain weights corresponding to different feature values. The calculating module is configured to compute the data processing fingerprint aggregate score corresponding to each data processing method. In some embodiments, acquiring module 501 may further comprise: an ordering module. The ordering module is configured to rank the data processing fingerprint aggregate scores from high to low.

In some embodiments, providing module 502 further comprises: a default method determining sub-module and a providing sub-module. The default method determining sub-module is configured to determine whether a user configured default data processing method exists. The providing sub-module is configured to, in the event that it is determined that no user configured default data processing method exists, provide the predicted preferred data processing method first among a presented ranking of the data processing methods.

In some embodiments, providing module 502 may further comprise: a designated method determining module, a comparing module, an accepting module, and an alerting module. The designated method determining module is configured to determine whether a user selected data processing method has been received. The comparing module is configured to, in the event it is determined that a user-designated data processing method exists, compare the user selected data processing method with data processing methods in the data processing method ranked list. The accepting module is configured to confirm the user selected data processing method in the event that the user selected data processing method is one of the data processing methods within a predetermined ranking range in the data processing method ranked list. The alerting module is configured to issue an alert to the user in the event that the user selected data processing method is not one of the data processing methods within a specific ranking range in the data processing method ranked list.

In some embodiments, providing module 502 may further consider the processing data corresponding to the current data processing in presenting the data processing methods.

Figure 6:
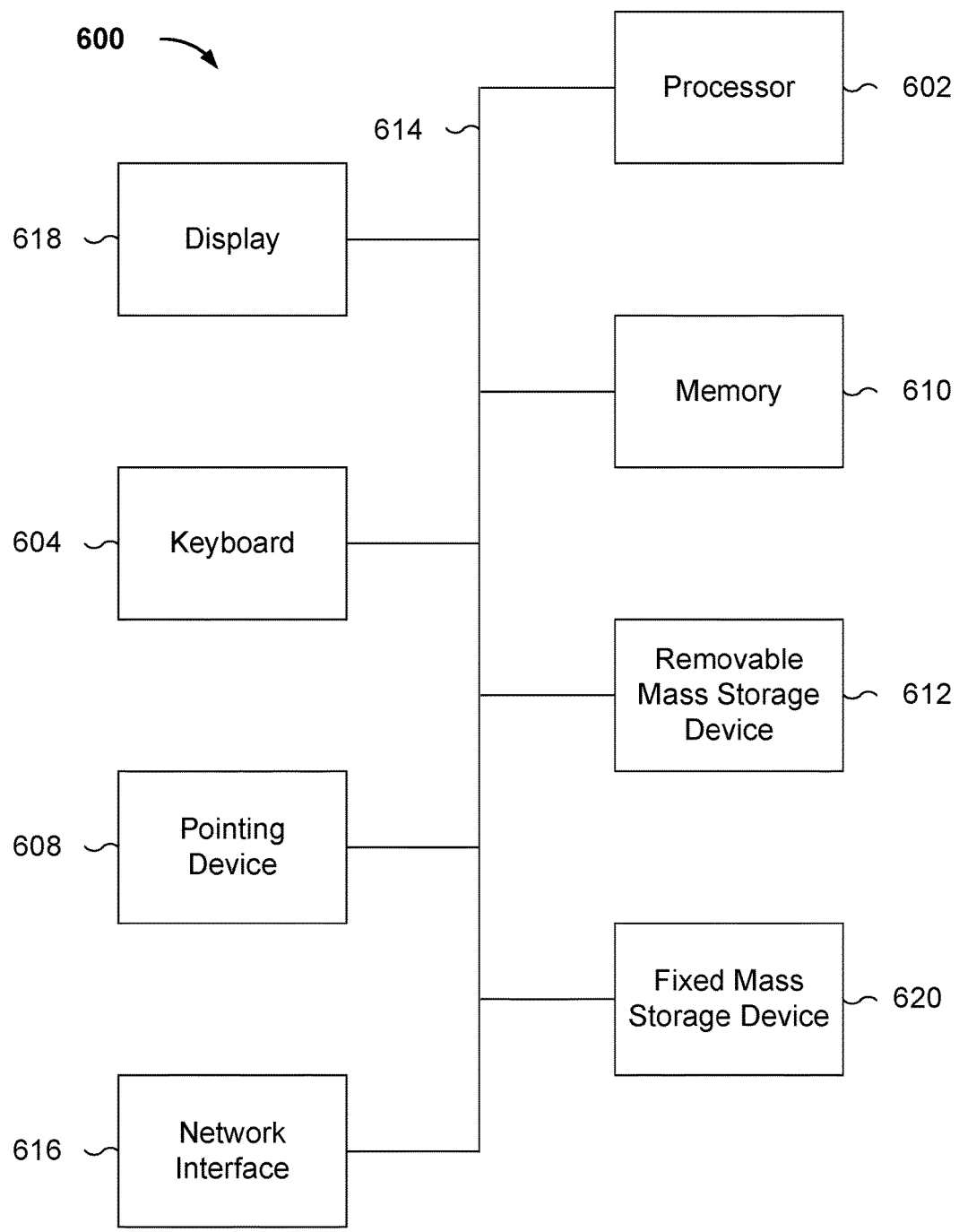
FIG. 6 is a functional diagram illustrating an embodiment of a programmed computer system for implementing a service for providing data processing methods.

FIG. 6 is a functional diagram illustrating an embodiment of a programmed computer system for implementing a service for providing data processing methods. As will be apparent, other computer system architectures and configurations can be used to determine message data to present based on a message. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide data processing methods.

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 608, as well as an auxiliary input/output device interface, a sound card, speakers, and other subsystems as needed. For example, the pointing device 608 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In one typical configuration, the computer equipment comprises one or more processors (CPUs), input/output interfaces, network interfaces, and memory. Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory, read-only memory (ROM), electrically erasable programmable read-only memory (EEPROM), flash memory, or other memory technology, CD-ROM, digit multifunction disc (DVD) or other optical storage, magnetic cassettes, magnetic tape or magnetic disc memory, or other magnetic storage equipment or any other non-transmission media that can be used to store information that is accessible to computers. As defined in this document, computer-readable media does not include transitory computer-readable media, such as modulated data signals and carrier waves.

The present application can be described in the general context of computer executable commands executed by a computer, such as a program module or unit. Generally, program modules or units include routines, programs, objects, components, data structures, etc. to execute specific tasks or implement specific abstract data types. Generally, program modules or units can be realized through software, hardware, or combinations of the two. The present application can also be carried out in distributed computing environments; in such distributed computing environments, tasks are executed by remote processing equipment connected via communication networks. In distributed computing environments, program modules or units can be located on storage media at local or remote computers that include storage equipment.

A person skilled in the art should understand that the embodiment of the present application can be provided as methods, systems or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

This document has employed specific embodiments to expound the principles and forms of implementation of the present application. The above embodiment explanations are only meant to aid in comprehension of the methods of the present application and of its main concepts. Moreover, a person with general skill in the art would, on the basis of the concepts of the present application, be able to make modifications to specific forms of implementation and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   receive a current request to provide a plurality of data processing methods associated with completing a service to a user, wherein the current request is associated with a plurality of current feature values;
   obtain historical data associated with a plurality of historical user selections associated with the plurality of data processing methods, wherein the plurality of historical user selections is associated with the user;
   determine a plurality of data processing fingerprint aggregate scores corresponding to respective ones of the plurality of data processing methods based at least in part on the historical data, comprising to:
   determine a subset of the plurality of historical user selections, wherein each historical user selection of the subset corresponds to a historical user selection that is associated with a historical feature value that matches a current feature value that is associated with the current request;
   sort the subset of the plurality of historical user selections into a plurality of groups according to the plurality of data processing methods; and
   determine a first data processing fingerprint aggregate score corresponding to a first data processing method based at least in part on a set of weights and a plurality of historical feature values corresponding to a group of historical user selections that corresponds to the first data processing method; and
   provide the plurality of data processing methods based at least in part on the plurality of data processing fingerprint aggregate scores; and
   one or more memories coupled to the one or more processors configured to provide the one or more processors with instructions.

2. The system of claim 1, wherein to determine the plurality of data processing fingerprint aggregate scores includes to:
   extract the plurality of historical feature values from the historical data; and
   obtain the set of weights corresponding to the plurality of historical feature values.

3. The system of claim 2, wherein to determine the plurality of data processing fingerprint aggregate scores further includes to convert at least some of the plurality of historical feature values based at least in part on a set of predetermined mappings.

4. The system of claim 1, wherein to provide the plurality of data processing methods comprises to:
   rank the plurality of data processing methods based on the corresponding plurality of data processing fingerprint aggregate scores; and
   present the plurality of data processing methods in a list based at least in part on the ranking.

5. The system of claim 1, wherein the one or more processors are further configured to determine whether a user configured default data processing method is stored.

6. The system of claim 5, wherein in the event that the user configured default data processing method is stored, wherein providing the plurality of data processing methods includes presenting the user configured default data processing method.

7. The system of claim 1, wherein the one or more processors are further configured to:
   receive a user selected data processing method; and
   determine whether the user selected data processing method is associated with a ranking within a predetermined range of rankings, wherein:
   in the event that the user selected data processing method is associated with the ranking within the predetermined range of rankings, proceed with further processing based at least in part on the user selected data processing method; and
   in the event that the user selected data processing method is associated with the ranking that is not within the predetermined range of rankings, send an alert to a client device associated with the user.

8. The system of claim 7, wherein the alert includes an authentication code.

9. The system of claim 8, wherein the one or more processors are further configured to:
   receive a user input; and
   determine whether the user input matches the authentication code, wherein:
   in the event that the user input matches the authentication code, proceed with further processing based at least in part on the user selected data processing method; and
   in the event that the user input does not match the authentication code, do not proceed with further processing based at least in part on the user selected data processing method.

10. The system of claim 1, wherein to provide the plurality of data processing methods is further based at least in part on data associated with the current request.

11. The system of claim 1, wherein to provide the plurality of data processing methods based at least in part on the plurality of data processing fingerprint aggregate scores includes presenting a data processing method of the plurality of data processing methods associated with a highest data processing fingerprint aggregate score of the plurality of data processing fingerprint aggregate scores in a first position of a list of data processing methods.

12. The system of claim 1, wherein the plurality of data processing methods comprises a plurality of payment methods.

13. The system of claim 1, wherein the plurality of current feature values comprises one or more of the following: a time at which the historical user selection was made, a device type used to make the historical user selection, a location at which the historical user selection was made, and a monetary amount associated with the historical user selection.

14. A method, comprising:
   receiving a current request to provide a plurality of data processing methods associated with completing a service to a user, wherein the current request is associated with a plurality of current feature values;
   obtaining historical data associated with a plurality of historical user selections associated with the plurality of data processing methods, wherein the plurality of historical user selections is associated with the user;

determining, using one or more processors, a plurality of data processing fingerprint aggregate scores corresponding to respective ones of the plurality of data processing methods based at least in part on the historical data, comprising:
  determining a subset of the plurality of historical user selections, wherein each historical user selection of the subset corresponds to a historical user selection that is associated with a historical feature value that matches a current feature value that is associated with the current request;
  sorting the subset of the plurality of historical user selections into a plurality of groups according to the plurality of data processing methods; and
  determining a first data processing fingerprint aggregate score corresponding to a first data processing method based at least in part on a set of weights and a plurality of historical feature values corresponding to a group of historical user selections that corresponds to the first data processing method; and
providing the plurality of data processing methods based at least in part on the plurality of data processing fingerprint aggregate scores.

15. The method of claim 14, wherein determining the plurality of data processing fingerprint aggregate scores includes:
  extracting the plurality of historical feature values from the historical data; and
  obtaining the set of weights corresponding to the plurality of historical feature values.

16. The method of claim 15, wherein determining the plurality of data processing fingerprint aggregate scores further includes converting at least some of the plurality of historical feature values based at least in part on a set of predetermined mappings.

17. The method of claim 14, wherein providing the plurality of data processing methods comprises:
  ranking the plurality of data processing methods based on the corresponding plurality of data processing fingerprint aggregate scores; and
  presenting the plurality of data processing methods in a list based at least in part on the ranking.

18. The method of claim 14, further comprising determining whether a user configured default data processing method is stored.

19. The method of claim 18, wherein in the event that the user configured default data processing method is stored, wherein providing the plurality of data processing methods includes presenting the user configured default data processing method.

20. The method of claim 14, further comprising:
  receiving a user selected data processing method; and
  determining whether the user selected data processing method is associated with a ranking within a predetermined range of rankings, wherein:
    in the event that the user selected data processing method is associated with the ranking within the predetermined range of rankings, proceeding with further processing based at least in part on the user selected data processing method; and
    in the event that the user selected data processing method is associated with the ranking that is not within the predetermined range of rankings, sending an alert to a client device associated with the user.

21. The method of claim 20, wherein the alert includes an authentication code.

22. The method of claim 21, further comprising:
  receiving a user input; and
  determining whether the user input matches the authentication code, wherein:
    in the event that the user input matches the authentication code, proceeding with further processing based at least in part on the user selected data processing method; and
    in the event that the user input does not match the authentication code, not proceeding with further processing based at least in part on the user selected data processing method.

23. A computer program product, the computer program product being embodied in a non-transitory computer readable storage medium and comprising instructions for:
  receiving a current request to provide a plurality of data processing methods associated with completing a service to a user, wherein the current request is associated with a plurality of current feature values;
  obtaining historical data associated with a plurality of historical user selections associated with the plurality of data processing methods, wherein the plurality of historical user selections is associated with the user;
  determining a plurality of data processing fingerprint aggregate scores corresponding to respective ones of the plurality of data processing methods based at least in part on the historical data, comprising:
    determining a subset of the plurality of historical user selections, wherein each historical user selection of the subset corresponds to a historical user selection that is associated with a historical feature value that matches a current feature value that is associated with the current request;
    sorting the subset of the plurality of historical user selections into a plurality of groups according to the plurality of data processing methods; and
    determining a first data processing fingerprint aggregate score corresponding to a first data processing method based at least in part on a set of weights and a plurality of historical feature values corresponding to a group of historical user selections that corresponds to the first data processing method; and
  providing the plurality of data processing methods based at least in part on the plurality of data processing fingerprint aggregate scores.

* * * * *